United States Patent

Ulvio

[11] Patent Number: 5,923,396
[45] Date of Patent: Jul. 13, 1999

[54] SPECTACLES WITH SUPPLEMENTAL LENSES

[76] Inventor: Kari Ulvio, Kauppakatu 13, FIN-08100 Lohja, Finland

[21] Appl. No.: 08/894,032
[22] PCT Filed: Jan. 26, 1996
[86] PCT No.: PCT/FI96/00053
§ 371 Date: Jul. 24, 1997
§ 102(e) Date: Jul. 24, 1997
[87] PCT Pub. No.: WO96/23242
PCT Pub. Date: Aug. 1, 1996

[30] Foreign Application Priority Data

Jan. 26, 1995 [FI] Finland ................................. 950333
May 11, 1995 [FI] Finland ................................. 952285

[51] Int. Cl.$^6$ ................................................. G02C 7/08
[52] U.S. Cl. .......................... 351/57; 351/158; 359/409
[58] Field of Search ............................. 351/57, 47, 158; 359/409, 411

[56] References Cited

U.S. PATENT DOCUMENTS 4,647,165  3/1987  Lewis ......................................... 351/57
5,446,507  8/1995  Chang ........................................ 351/57

Primary Examiner—Huy Mai
Attorney, Agent, or Firm—Baker & Daniels

[57] ABSTRACT

A pair of spectacles is provided with supplemental lenses which are mounted on arms supported on the bridge connecting the primary lenses of the spectacles. The arms are mounted on the bridge by a clip mounted on the bridge by a screw engaging the end portions of a clamping loop extending around the bridge. The supplemental lenses may be binocular loupes which are attached to the bridge via relatively flat cross arms that are flat in a direction transverse to the primary lenses so that there is no substantial obstruction of the primary lenses.

14 Claims, 6 Drawing Sheets

SPECTACLES WITH SUPPLEMENTAL LENSES

The present invention relates to a fixing assembly, capable of fitting spectacles with supplemental lenses which serve as filters, protective shields and/or magnifying glasses over a restricted sub-area of the actual lenses. The fixing assembly includes mechanical holders which enable the positioning, aligning and/or maintaining the alignment of supplemental lenses.

For example, the dentists have a need to wear a protective shield for blocking the radiation of a UV-curing device from striking directly on the eyes. A separate UV-protection shield held by a dental assistant is inconvenient to use. In addition to UV-radiation, the protection can be applied to any ophtalmologically harmful radiation. In addition, the separate lenses may also serve as filters for making certain objects more clearly detectable.

On the other hand, it is often desirable that the spectacles be provided with a magnifying sub-area that can be used in precision work which requires magnification from time to time. Manufacturing special bifocal glasses for this purpose is expensive.

A fixing assembly of the invention can also be used for fitting the spectacles with binocular loupes, comprising an attachment frame and two loupes, each provided with at least two lenses of which the ocular lens closer to the eye is smaller than the outer objective lens.

Such binocular loupes to be attached to spectacles are intended to facilitate precision work, such as the work of a dentist or of a precision mechanician. The drawbacks of prior art binocular loupes include a complicated design and an excessive weight as well as a restricted field of vision caused by the loupes. U.S. Pat. No. 5,182,588 anticipates the attachment of a protective coating to the surface of spectacle lenses over a restricted sub-area of the lens. A thin surface coating is difficult to manufacture and it alters the spectacles permanently and, thus, the solution is poorly adaptable to spectacles adjusted to each individual's own eyes. Furthermore, the coating formed by a thin layer is difficult to provide with a sufficient protective effect if clear transparency is desired at the same time. The coating only offers protection and does not provide a possibility of using simultaneously or alternatively a magnifying glass or a binocular loupe.

Moreover, e.g. U.S. Pat. No. 4,647,165 and U.S. Pat. No. 3,446,548 disclose the placement of various supplemental lenses over a sub-area of the actual lenses by means of mechanical, adjustable arms. These prior art solutions do not afford a reliable attachment for supplemental lenses and the attachment arrangement is not suitable for all types of spectacles. The attachment is often secured by manufacturing specially designed spectacles, leading to a substantial increase in total costs. The most general drawback in prior art attachment units based on mechanical attachment arms is the fact that the attachment assemblies obscure and interfere with the field of vision.

An object of the invention is to provide a fixing assembly for attachments mountable on the user's own spectacles, said assembly being as inconspicuous, easy to use and economically priced as possible and versatile in applying it to fixing various attachments. In the attachment of binocular loupes, for example, it is important that the fixing assembly and the loupes screen as little as possible of the field of vision, whereby the view can be readily directed past the loupes at the same target that has just been examined and magnified through the loupes.

A particular object of the invention is to provide a fixing assembly for supplemental lenses and/or binocular loupes, which is suitable for use in connection with many different types of spectacles.

These objects are achieved on the basis of the characterizing features set forth in the annexed claim.

For example, the use of resiliently flexible arms offers substantial benefits if compared to rigid hinged frames. The lenses carried by flexible arms are readily cleanable and return to the original position thereof.

Other embodiments of the invention assist in the individual focusing of loupes for setting the loupes precisely according to the ocular gap of a user and for minimal screening of the field of vision caused thereby.

The invention will now be described in more detail with reference made to the accompanying drawings, in which FIG. 1 is a frontal view of a fixing assembly of the invention for attaching supplemental lenses to spectacles;

Figure 1:
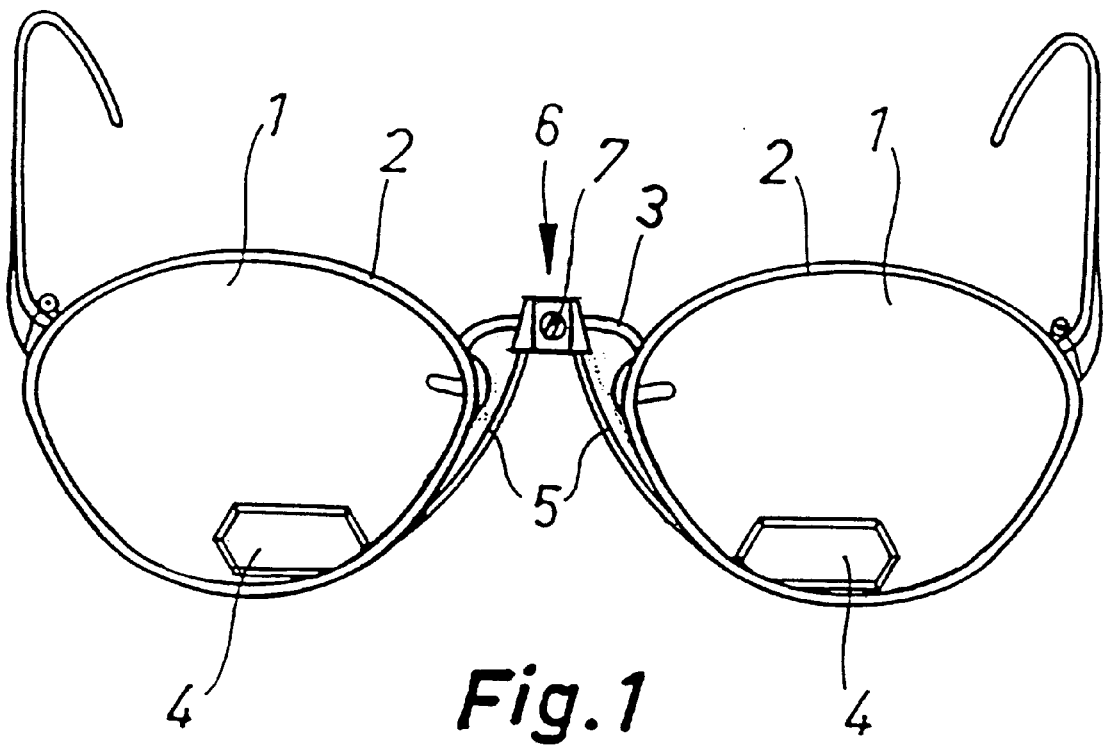

The fixing assembly for attaching supplemental lenses will be first described with reference made to FIGS. 1–6.

Supplemental lenses 4 protecting from ophtalmologically harmful radiation and/or serving as magnifying glasses and/or as filters are positioned on the inside surface of actual lenses 1 adjacent to the bottom edge of the lenses 1. Attachment of the supplemental lenses 4 is effected by means of resiliently flexible arms 5, comprising e.g. steel wire. The bottom ends of said arms 5 are fixed by means of an adhesive in a slot made in the bottom edge of the supplemental lenses 4. The top ends of said arms 5 are secured to a metal clip 6 that can be tightened with a screw 7. The metal clip 6 is in engagement with a bridge 3 connecting rims or eyewires 2 of the actual lenses across the nose. The metal clip 6 includes two body members 8, 9 for clamping the ends of the arms 5 therebetween by tightening the screw 7. A clamping hook 10 made of a flexible, soft metal, e.g. silver provides a gripping yoke around the bridge 3. The ends of said clamping hook 10 are received in a hole 11a, 11b, extending through the body members 9, 8 and dimensioned relative to the screw 7 such that the screw threads engage with the material of the clamping hook 10. The clamping hook 10 can be provided with existing threads or those may be a result of cutting by the screw. Such a clip assembly makes it possible that a single screw 7 be used for clamping the clip securely to the bridge 3 and at the same time for pressing the arms 5 into the engagement with the clip. The surface of said clip body member 8, facing the other body member 9, is provided with grooves 12 less deep than diameter of the arms 5 for receiving said arms 5. Thus, the arms 5 retain the alignment thereof and, prior to final tightening of the screw 7, the length of the arms 5 can be regulated by a longitudinal adjustment thereof between the body members 8, 9 for placing the supplemental lens 4 in a proper position. Finally, the extra length from the top ends of the arms 5 can be cut off. If the arms cannot be fixed from below, it can be done from above by bending down the arms extending from the top edge of the clips.

In addition, the body member 8 of the clip 6 is designed for an engagement with a yoke-like holder 14 mounted on the base of an arm 15 supporting a separate magnifying and/or protective glass 16. The yoke-like holder 14 is pressed from above on top of the body member 8 with ribs included in the inner surfaces of the yoke 4 engaging grooves 13. This type of magnifying glass 16 in association with spectacles is prior known but, according to the invention, it is attached in a new fashion by means of a lightweight holder yoke 14 to a metal clip 6 of the invention.

Figure 2:
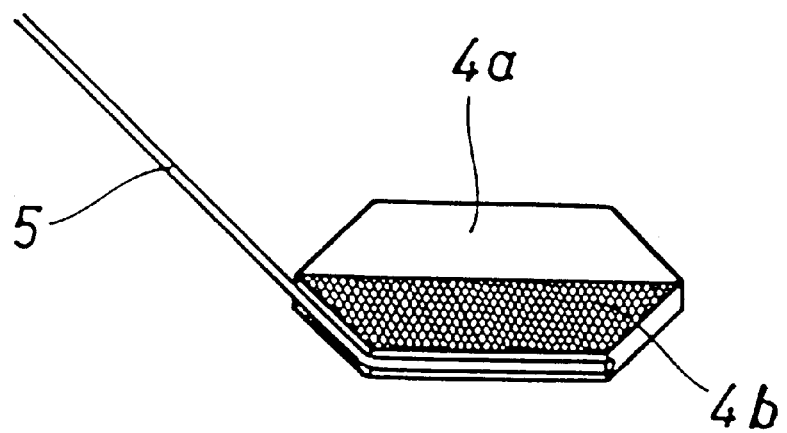
FIG. 2 shows in a larger scale the attachment between a supplemental lens and its holding arm.
Figure 3:
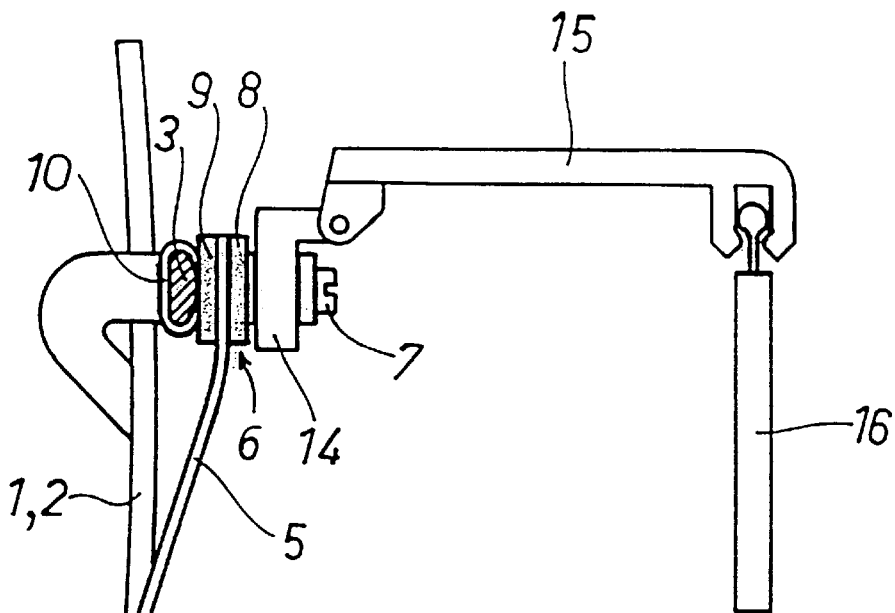
FIG. 3 is a larger-scale side view of a supplemental lens attachment clip and the setting of a supplemental lens 4 relative to a spectacle lens. The figure also depicts the attachment of a separate magnifying glass 16 by means of the same metal clip.
Figure 4:
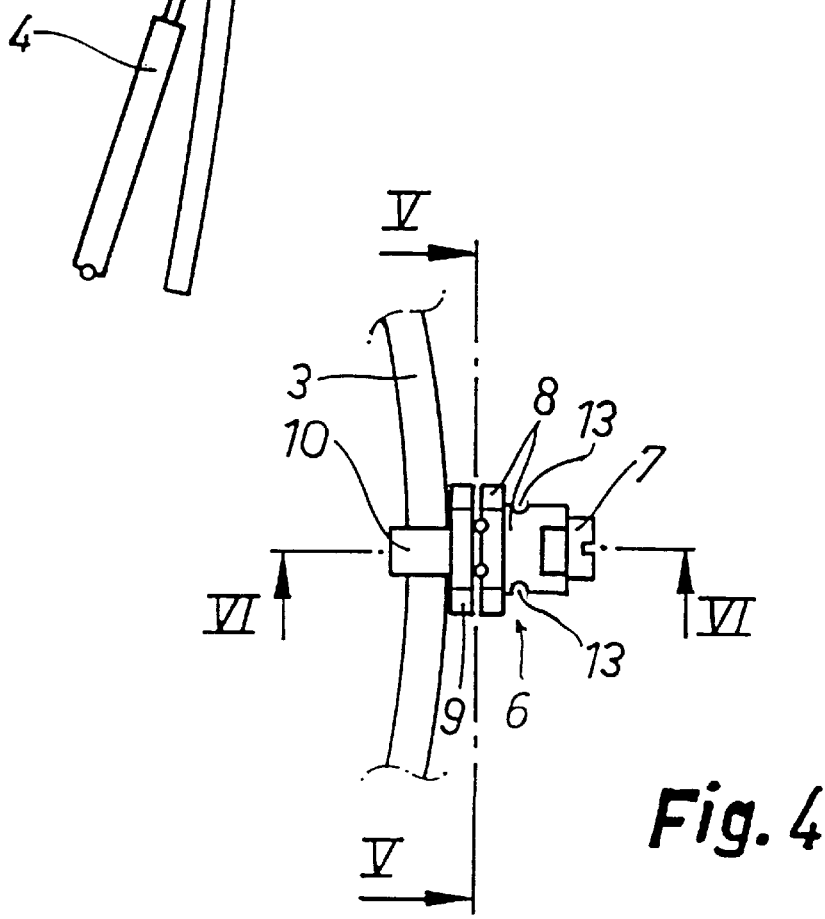
FIG. 4 is a plan view of a metal clip included in the fixing assembly of FIG. 3.
Figure 5:
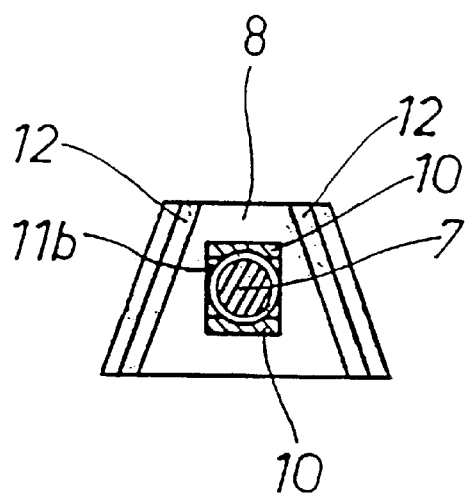
FIG. 5 is a section along a line V—V in FIG. 4.
Figure 6:
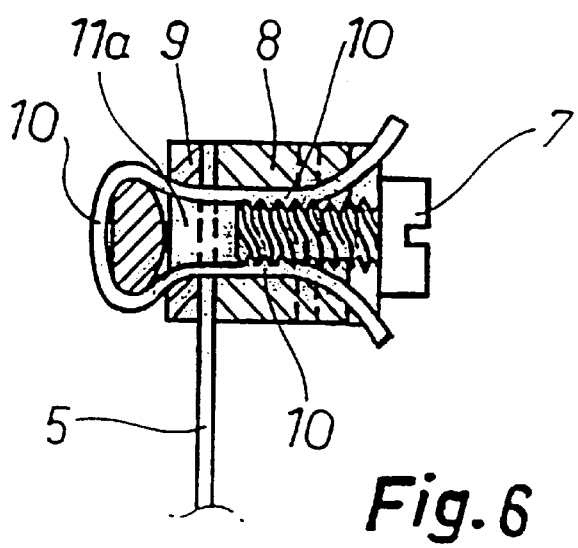
FIG. 6 is a section along a line VI—VI in FIG. 4.
Figure 7:
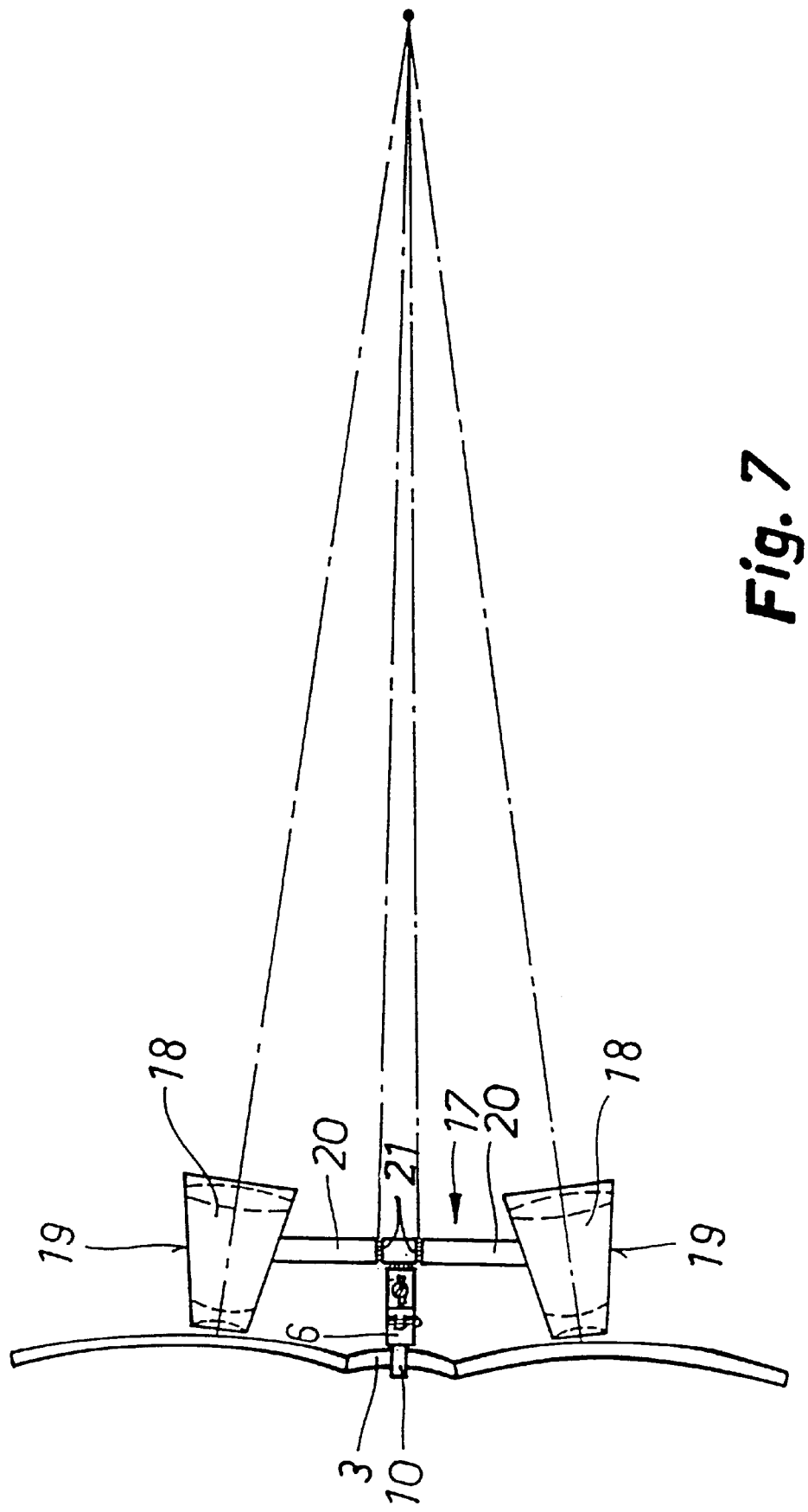
FIG. 7 is a plan view of a fixing assembly of the invention for attaching loupes to spectacles.
Figure 8:
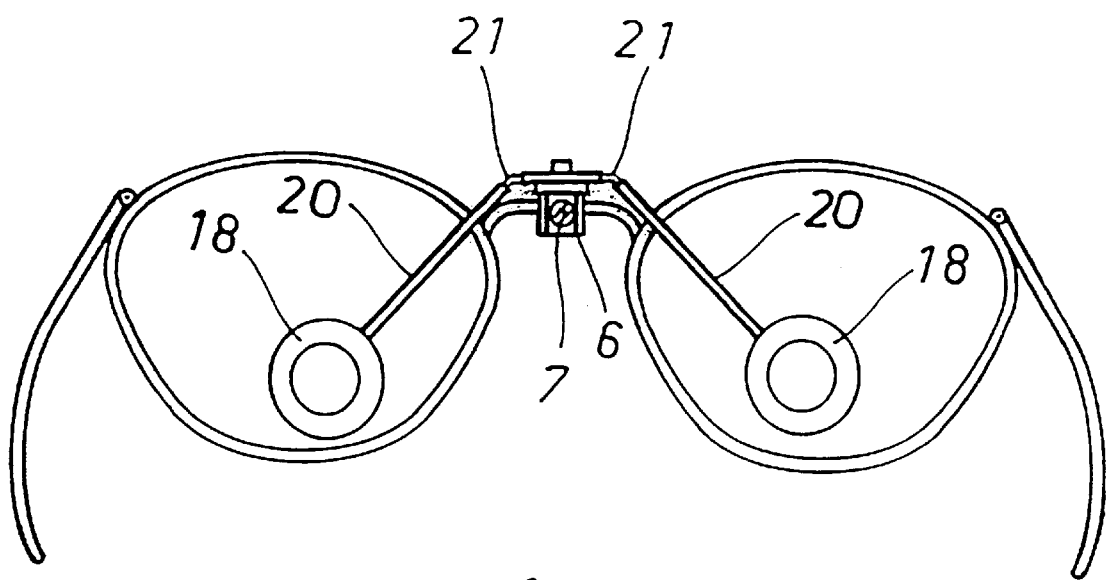
FIG. 8 is a frontal view of the binocular loupes shown in FIG. 7.
Figure 9:
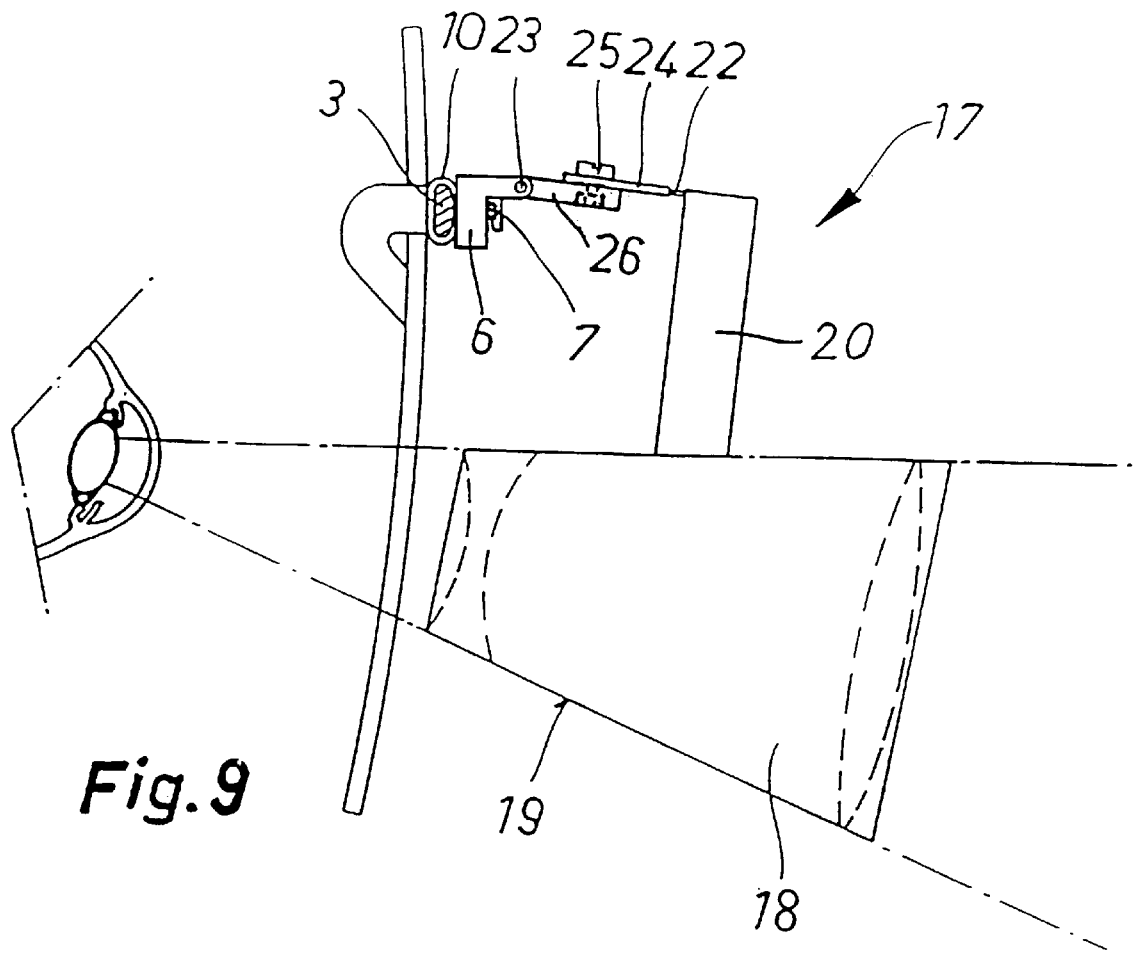
FIG. 9 is a side view of the same binocular loupes.
Figure 10:
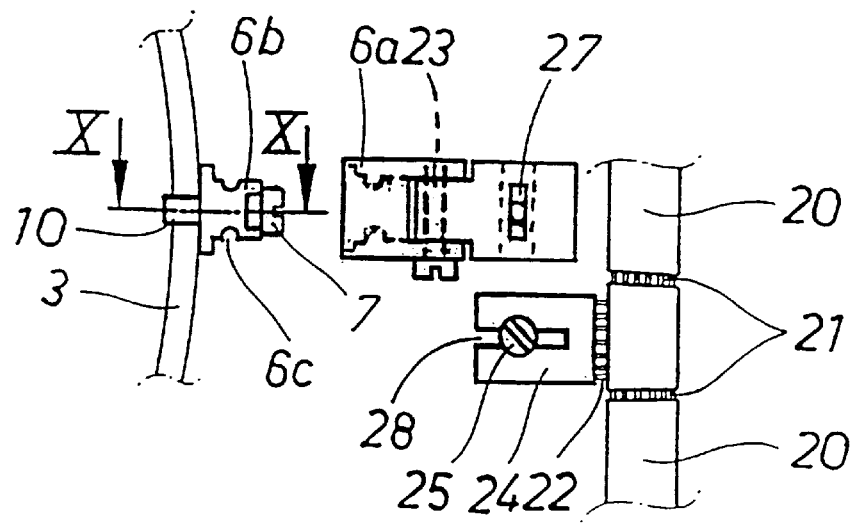
FIG. 10 is a more detailed view of loupe attachment arms with their hinges and adjustment facilities.

FIG. 2 shows in more detail the possibility that the bottom half of a supplemental lens 4 comprises a protective glass 4b and the top half a magnifying glass 4a. In this case, a separate magnifying glass 16 is not needed. Alternatively, either one of the magnifying glasses 4a or 16 can be a filter or a combination of a filter and a magnifying glass.

The following description deals with the exemplary embodiment shown in FIGS. 7–10.

Binocular loupes 18 are fastened by means of a bracket 17 to a nose bridge 3 included in spectacles. Each loupe 18 is fitted with at least two lenses of which the ocular lens closer to the eye is smaller than the outer objective lens. As for its outer surface, a loupe jacket 19 connecting the lenses also diverges at a sector angle which is essentially consistent with that drawn from the pupil to the rim of the ocular lens. Thus, restriction of the field of vision caused by the loupes is minimal. The user is able to look through or past the loupes according to his or her choice by just slightly turning the viewing direction and the head.

The loupe jackets 19 may consist of tubes having a thin wall thickness and a conicity which is consistent with said sector angle. The loupe jacket material may be a metal, fiber-reinforced plastics etc. The loupe jacket may have a cross-section which is circular, elliptical or polygonal.

The loupes 18 are mounted on flat crossarms 20 which can be bent at hinge points 21 that are made of a metal and have a shape which changes as a result of bending. The hinge points 21 can be made of a material other than the arms 20, e.g. wire threads embedded in the arm material which is e.g. light metal or fiber-reinforced plastics. The axial directions of hinges 21 are selected so as to control bending of the arms 20 such that, in various positions of the loupes 18, the centre axes thereof cross each other at essentially the same distance from the binocular loupes 18. Thus, the loupes always remain on focus provided that the distance between the loupes is set according to the distance between the eyes.

At the mid-point thereof between the hinges 21, said crossarms 20 are connected to a lengthwise arm 24 whose attachment point is also provided with a hinge 22 made of a resilient metal. The arm element 24 is provided with a lengthwise slot 28 and the arm element 26 with a crosswise slot 27 and, thus, attachment of the arm elements 26 and 24 to each other by means of a screw 25 affords both a lengthwise and crosswise adjustment. The arm element 26 is connected with a hinge 23 to a yoke-like clip 6a which is mountable from above (or from below) on a metal attachment body 6b, having its sides provided with grooves 6c and the inner surfaces of the yoke 6a being shaped accordingly. In this case, the members 6a and 6b together provide an attachment clip, generally designated by reference numeral 6. With this snap-fit coupling, the binocular loupes are readily removable and replaceable. The small-sized and inconspicuous attachment body 6b can be permanently fixed to the nose bridge 3 of spectacles. The attachment body 6b can be fixed to nearly all types of spectacles by using a clamping hook 10, made of a soft metal and constituting a loop which grips around the nose bridge 3 and whose ends are received in a hole extending through the attachment body 6b and dimensioned identically to the hole in the member 8 in FIG. 6, i.e. in such a manner that the threads of a screw 7 engage with those of the clamping hook 10. Such a clip is small, inconspicuous and firm and adaptable to nearly all types of spectacles.

What is essential about the invention is that the fixing assembly and the loupes are lightweight and only obscure a small section of the field of vision. This objective can be favored even further by designing a thin-walled loupe jacket so as to comply with the sector angle of a field of vision covered by a small-sized ocular lens. In addition, the flat shape and positioning of attachment arms are selected so as to interfere minimally with the field of vision. At the same time, however, the attachment arms, with the aid of their hinge points, enable an individual alignment and setting of the distance between the eyes, such that the loupes have a focus always fixed in position. The loupes may have a length of e.g. 20–30 mm. The ocular lens may have a diameter of e.g. about 10 mm. The ocular lens' distance from the eye is in the order of 20 mm when the lens is positioned very close to the lens of spectacles. The objective has a diameter which is determined by the sector angle and the length of the loupes.

I claim:

1. A fixing assembly for attaching supplemental lenses to spectacles having primary lenses connected by a bridge, said fixing assembly comprising a clip having a clip body on one side of said bridge and a clamping hook extending from said clip body around said bridge, said clamping hook having a pair of end portions received within said clip body, a pair of arms extending from said clip body, said supplemental lenses being mounted on said arms, and a screw extending into an opening in said clip body and threadedly engaging each of said end portions to thereby tighten said clamping hook about said bridge as said screw is advanced relative to said end portions.

2. The assembly as set forth in claim 1 wherein said arms are flexible and resilient.

3. The assembly as set forth in claim 2, wherein the clip includes a pair of members, said arms having ends clamped between said members.

4. The assembly as set forth in claim 1, wherein the arms have opposite ends, one end of each arm being attached to an edge of a corresponding one of the supplemental lenses and the other end of each of the arms are secured by said clip.

5. The assembly as set forth in claim 1, wherein the clip is made of metal.

6. The assembly as set forth in claim 1, wherein the clip body engages a yoke-like holder mounted on an arm supporting a separate supplemental lens.

7. The assembly as set forth in claim 1, wherein the supplemental lenses are supported between the primary lenses and a wearer of the spectacles and of adjacent to a bottom portion of the primary lenses.

8. The assembly as set forth in claim 1, wherein the supplemental lenses are a pair of binocular loupes, each binocular loupe including at least two pair of binocular lenses, one of the binocular lenses being a smaller inner ocular lens and the other lens being an outer objective lens; said ocular having a rim, a loupe jacket connecting the binocular lenses, said loupe jacket diverging along line a sector angle which is substantially the same as the sector angle drawn from the pupil of an eye of a wearer to the rim of the ocular lens, the arms attaching the loupes to the clip body, said arms being flat in a direction transverse to the primary lenses, whereby the arms do not substantially obstruct the primary lenses.

9. The assembly as set forth in claim 8, wherein the loupe jackets are concentric with said sector angle, the loupes being attached to crossarms extending from the spectacles, said crossarms being foldable at hinge points made of a metal deformable upon bending.

10. The fixing assembly as set forth in claim 9, wherein said loupes have center axes, said hinge points controlling the folding of said crossarms to maintain the crossing of the center axes of the loupes at substantially the same distance from the loupes regardless of the angle of the arms.

11. The fixing assembly as set forth in claim 9, wherein the crossarms are connected to a central arm which is provided with a folding hinge and an adjustment permitting movement of the crossarms toward and away from the primary lenses.

12. A pair of spectacles for use by a wearer including a pair of primary lenses and a pair of secondary lenses supported over the primary lenses, a bridge connecting the primary lenses, said secondary lenses being a pair of binocular loupes, each binocular loupe including at least two binocular lenses, one of the said at least two binocular lenses being an inner ocular lens and the other binocular lens being an outer objective lens; said ocular lens having a rim, a loupe jacket connecting the binocular lenses, said loupe jacket diverging along a sector which is substantially the same as a sector drawn from the pupil of an eye wearer to the rim of the ocular lens, said binocular loupes being attached to the spectacles by attachment arms, said attachment arms being flat in a direction transverse to the primary lenses whereby the secondary lenses do not substantially obstruct the primary lenses, the loupe jackets being concentric with said sector, said attachment arms being crossarms extending from the spectacles, said crossarms being foldable at hinge points made of a deformable metal to permit bending.

13. The assembly as set forth in the claim 12, wherein said loupes have center axes, said hinge points controlling the folding of said crossarms to maintain the crossing of the center axes of the loupes at substantially the same distance from the loupes regardless of the angle of the arms.

14. The assembly as set forth in claim 12, wherein the crossarms are connected to a central arm which is provided with a folding hinge, and an adjustment permitting movement of the crossarms toward and away from the primary lenses.

\* \* \* \* \*